United States Patent [19]
Mori

[11] Patent Number: 5,608,875
[45] Date of Patent: Mar. 4, 1997

[54] PRE-READ CONTROL METHOD FOR MAGNETIC TAPE AND APPARATUS FOR PERFORMING THE SAME

[75] Inventor: Yoshiaki Mori, Tokyo, Japan

[73] Assignee: NEC Corporation, Tokyo, Japan

[21] Appl. No.: 319,728

[22] Filed: Oct. 7, 1994

[30] Foreign Application Priority Data

Oct. 8, 1993 [JP] Japan .................................. 5-275988

[51] Int. Cl.⁶ ..................................................... G06F 3/06
[52] U.S. Cl. ......................................................... 395/250
[58] Field of Search ........................ 364/DIG. 1, DIG. 2; 395/200.01, 250

[56] References Cited

U.S. PATENT DOCUMENTS

| | | | |
|---|---|---|---|
| 3,772,657 | 11/1973 | Marsalka et al. | 395/185.01 |
| 3,836,891 | 9/1974 | McDaniel | 364/474.01 |
| 5,327,535 | 7/1994 | Ogata et al. | 395/440 |

Primary Examiner—Robert B. Harrell
Attorney, Agent, or Firm—Whitham, Curtis, Whitham & McGinn

[57] ABSTRACT

Magnetic tape pre-read method for using the buffer for pre-read efficiently is provided. This method is executed in a pre-read control unit provided with a buffer margin memory portion and a counter. In this method, the size of data block read from a magnetic tape and the contents of the buffer margin memory portion is compared. When the size of the data block is larger than the contents of the buffer margin memory portion, the counter is incremented. If the count of the counter reaches a predetermined value as a result of the increment, the maximum value of the seize of the data blocks read out in the past is set in the buffer margin memory portion. The count of the counter does not reach the predetermined value unless large blocks appear successively. Therefore, even if large data blocks appear sporadically, the contents of the buffer margin memory portion is maintained.

21 Claims, 15 Drawing Sheets

BLS: SIZE OF BLOCK READ OUT
INIT: CONTENT OF BUFFER MARGIN INITIAL VALUE MEMORY PORTION 15
MGN: CONTENT OF BUFFER MARGIN MEMORY PORTION 16
MAX: CONTENT OF MAXIMUM BLOCK SIZE MEMORY PORTION 17
CNT: COUNT OF COUNTER 18
α: CONSTANT

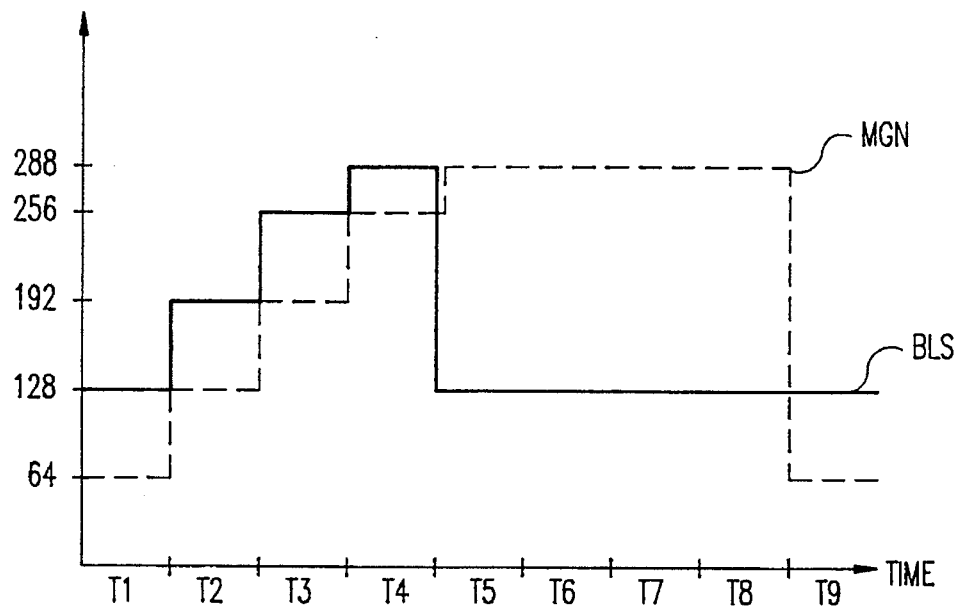
FIG.15A
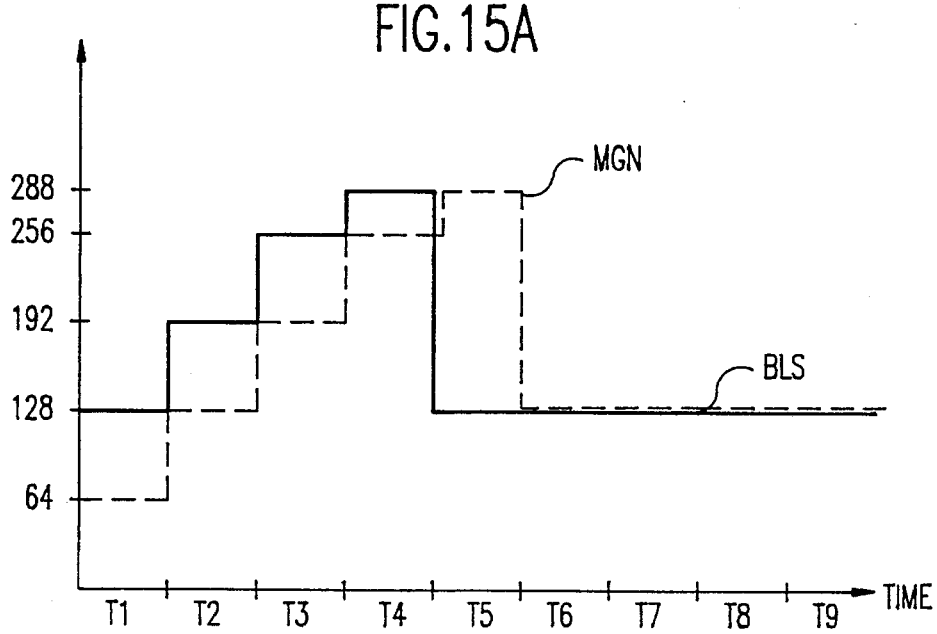
FIG.15B
| TBL(1) | 0 | 0 | 0 | 0 | 128 | 128 | 128 | 128 | 128 |
| --- | --- | --- | --- | --- | --- | --- | --- | --- | --- |
| TBL(2) | 0 | 0 | 0 | 128 | 192 | 192 | 192 | 192 | 192 |
| TBL(3) | 0 | 0 | 128 | 192 | 256 | 256 | 256 | 256 | 256 |
| TBL(4) | 0 | 128 | 192 | 256 | 288 | 288 | 288 | 288 | 288 |
FIG.15C

PRE-READ CONTROL METHOD FOR MAGNETIC TAPE AND APPARATUS FOR PERFORMING THE SAME

BACKGROUND OF THE INVENTION

The magnetic tape unit has been used as an external memory device for a computer. Recently, in order to accommodate to an increase of magnetic tape performance, a magnetic tape unit of streaming system has being popularized. In such streaming type magnetic tape unit, the tape running is directly controlled by a reel motor, without stopping the tape in an inter-block gap (referred to as "IBG, hereinafter") which is a blank portion between adjacent data blocks.

In the magnetic tape unit of streaming system, the number of stoppages of magnetic tape is desirably as small as possible since acceleration/deceleration of tape requires a long time. Pre-read/Post write is one of methods for reducing the number of required stoppages of magnetic tape.

For pre-read, a buffer is provided between a host system and a read/write control portion. A pre-read control unit for controlling pre-read operation reads data more than that instructed by the upper device. Data read out is temporarily stored in the buffer. The term "pre-read" is to start read operation before instruction from the host system. When the upper device accesses pre-read data, the data is sent from the buffer to the host system. Since there is no need of stopping magnetic tape every completion of read of data block instructed by the upper device, the number of tape stoppages is reduced.

In pre-reading, it is necessary to judge a data position at which a pre-read is to be stopped. When size of data read out is larger than an available capacity of the buffer, that data can not be stored in the buffer. In order to read the data which could not be stored in the buffer, the magnetic tape must be rewound back to a head of the data block. There are at least five steps to be executed from the rewinding of tape to re-read of the data block. The five steps are as follows:

(1) Acceleration and deceleration of tape for positional correction. This positional correction is necessary to run the tape in a reverse direction.

(2) Acceleration, transportation and deceleration for running the tape in the reverse direction.

(3) Acceleration and deceleration for positional correction. This positional correction is necessary to correct a distance required for deceleration.

(4) Acceleration and deceleration for positional correction. This positional correction is necessary to run the tape and re-read the data.

(5) Tape transportation for re-reading the data.

Each of these steps includes acceleration/deceleration of tape. Therefore, in order to execute the series of steps, a long time is required. On the other hand, if the pre-read is stopped at an appropriate block, it is possible to read data immediately by only one acceleration. Therefore, the judgement as to a block at which the pre-read is to be interrupted has a considerable influence effective transfer rate.

If the size of data block is constant, the judgement as to interruption of pre-read is easy since it is enough to stop pre-read when the available capacity of the buffer becomes equal to or smaller than the size of the data block. A threshold value of the available capacity of the buffer at which pre-read is to be interrupted is referred to as "buffer margin". In this case, the buffer margin equals to the size of the data block.

When respective data blocks are different in size, the judgement of interruption of pre-read is difficult since it is necessary to predict change of block size and change the buffer margin correspondingly to a predicted change.

In a prior art for performing a pre-read under the circumstance, size of a preceding data block read out is set as the buffer margin and the pre-read is continued when the preceding data block size is smaller than an available capacity of a buffer or interrupted when it is larger than the available buffer capacity.

Such judgement is effective of data blocks of identical size appear successively. A case where 100 data blocks each having size of 64 kB appear successively and thereafter 100 data blocks each having size of 128 kB appear successively is an example of the above condition. In this case, the size of every data block is 64 kB in a time period from a completion of read of a first data block to a start of read of a 101th data block and 128 kB in a time period from a completion of read of the 101th data block to a completion of read of a 200th data block. The size of the data block read out is different from the buffer margin at only the 101th data block.

On the other hand, in a case where large data blocks appear sporadically, the efficiency of buffer utilization is lowered when the above-mentioned prior art is used. That is, assuming a case where a data block having size of 128 kB appears when usual block size is 64 kB, the buffer margin may be set at 128 kB temporarily. Therefore, in this case, pre-read is interrupted when an available capacity of the buffer is not larger than 128 kB, even if size of a following data block is 64 kB and the available buffer capacity is not smaller than 64 kB. Such premature interruption of pre-read occurs every data block of 128 kB and thus the utilization efficiency of the buffer is lowered when such large data blocks appear sporadically repetitively.

Such sporadic appearance of large data blocks may occur frequently when an auto-blocking technology is used. The auto-blocking technology is used to form a data block having size substantially equal to a reference value from a set of small data pieces called packets. The auto-blocking technics will be described later.

SUMMARY OF THE INVENTION

In view of the above-mentioned problem, an object of the present invention is to provide a magnetic tape pre-read control method by which a buffer for pre-read can be used efficiently even when respective data blocks are different in size from each other.

In detail, the present invention resides in a provision of a magnetic tape pre-read control method by which a buffer for pre-read can be used efficiently even when data blocks having size substantially different from a reference value appear sporadically. The latter situation may occur when the auto-blocking and/or data compression technology is utilized.

The object of the present invention is achieved by updating a count of a counter when a read block size becomes different from a buffer margin by a predetermined amount and updating the buffer margin when the count of the counter becomes a predetermined value. The value of the buffer margin is determined on the basis of sizes of a plurality of data blocks read out in the past. For example, the buffer margin is set to the maximum value of size of the data blocks read out in the past.

In more detail, the magnetic tape pre-read control method according to the present invention is executed in a magnetic tape pre-read control unit composed of a buffer, first memory means, second memory means and a counter.

This pre-read control method comprises the steps of setting the initial value in the first memory means, reading a data block from a magnetic tape and storing the data block in the buffer; obtaining a size of the data block; storing the size of the data block in the second memory means when the size of the data block is larger than a content of the second memory means; adding a predetermined value to a value of the counter when the size of the data block is larger than a content of the first memory means; storing the content of the second memory means in the first memory means when, as a result of the addition, the value of the counter becomes the predetermined value; and interrupting a pre-read when an available capacity of the buffer is smaller than the content of the first memory means and continuing the pre-read otherwise.

When the size of the data block is smaller than the content of the first memory means, the content of the counter is subtracted by a predetermined value. When the value of the counter becomes a predetermined value as a result of the subtraction, an initial value is set in the first memory means.

According to another aspect of the present invention, the pre-read control method comprises the steps of setting the initial value in the first memory means; reading a data block from a magnetic tape and storing the data block in a buffer; obtaining a size of the data block; adding a predetermined value to a value of the counter when the size of the data block is larger than a content of the first memory means; storing a value of values in the second memory means which is the nearest to the size of the data block in the first memory means when, as a result of the addition, the value of the counter becomes the predetermined value; and interrupting a pre-read when an available capacity of the buffer is smaller than the content of the first memory means and continuing the pre-read otherwise.

When the size of the data block is smaller than the content of the first memory means, the content of the counter is subtracted by a predetermined value. When the value of the counter becomes a predetermined value as a result of the subtraction, one of values set in the second memory means which is smaller than the value set in the first memory means is set in the first memory means.

According to a further aspect of the present invention, the pre-read control method comprises the steps of setting the initial value in the first memory means; reading a data block from a magnetic tape and storing the data block in a buffer; obtaining a size of the data block; storing the size of the data block in the second memory means when the size of the data block is larger than a minimum value stored in the second memory means; adding a predetermined value to a value of the counter when the size of the data block is larger than a content of the first memory means; storing the largest value stored in the second memory means in the first memory means when, as a result of the addition, the value of the counter becomes the predetermined value; and interrupting a pre-read when an available capacity of the buffer is smaller than the content of the first memory means and continuing the pre-read otherwise.

When the size of the data block is between the content of the first memory means and the minimum value stored in the second memory means, the content of the counter is subtracted by a predetermined value. When the value of the counter becomes a predetermined value as a result of the subtraction, one of values set in the second memory means which is nearest to the size of the data block is stored in the first memory means.

Further, when the size of the data block is smaller than the minimum value stored in the second memory means, the content of the counter is subtracted by a predetermined value. When the value of the counter becomes a predetermined value as a result of the subtraction, the initial value is set in the first memory means.

In either of these aspects, it is preferable to initialize the contents of the first and second memory means when the magnetic tape is replaced by new one.

BRIEF DESCRIPTION OF THE DRAWINGS

Other objects, features and advantages of the present invention will become more apparent when the following description is read in conjunction with the accompanying drawings, wherein:

FIGS. 15(a), 15(b), and 15(c) shows an operation of the third embodiment; and

DETAILED DESCRIPTION OF THE PREFERRED EMBODIMENTS

First, a principle of the auto-blocking for forming a data block having size substantially larger than a reference value will be described.

Figure 1:
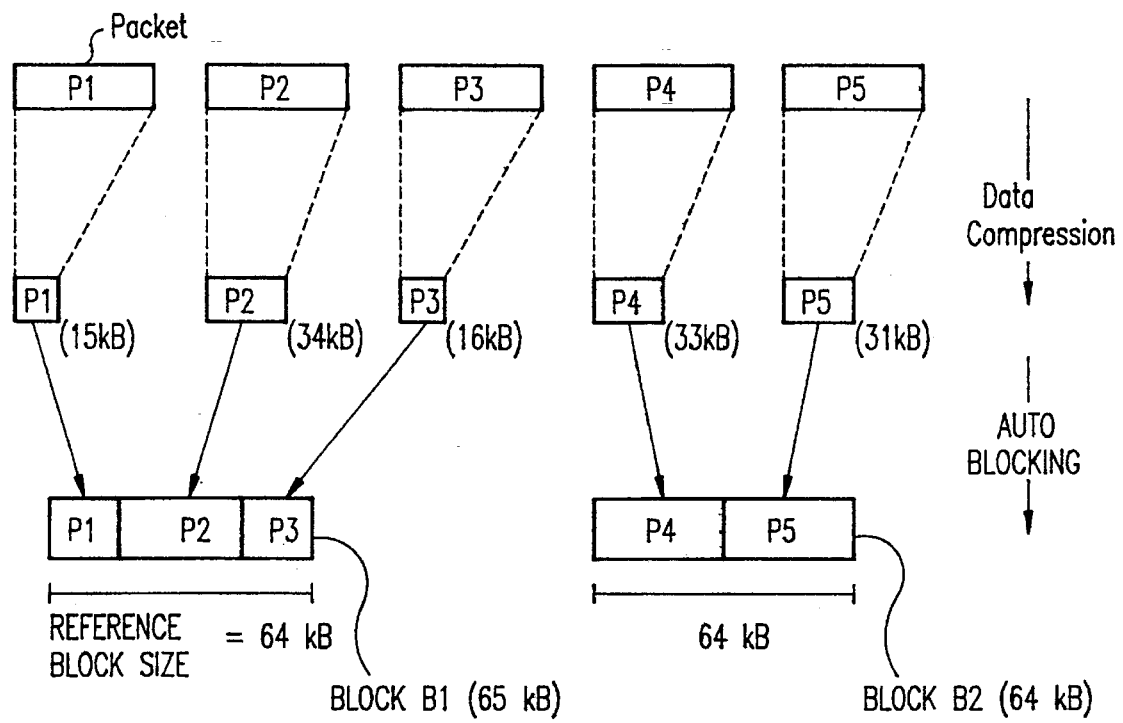
FIG. 1 shows steps for performing an auto-blocking.

Referring to FIG. 1, data packets P1 to P5 are datacompressed. Since compression rate differs from one packet to another, length of packet after compressed differs from one packet to another. In the auto-blocking, a plurality of packets are united such that size of a data block becomes substantially equal to a reference length. In the case shown in FIG. 1, the reference length is 64 kB. A block B1 is formed from the packets P1 to P3. Size of the data block B1 is 65 kB. A block B2 is formed from the packets P4 and P5. Size of the block B2 is 64 kB.

Figure 2:
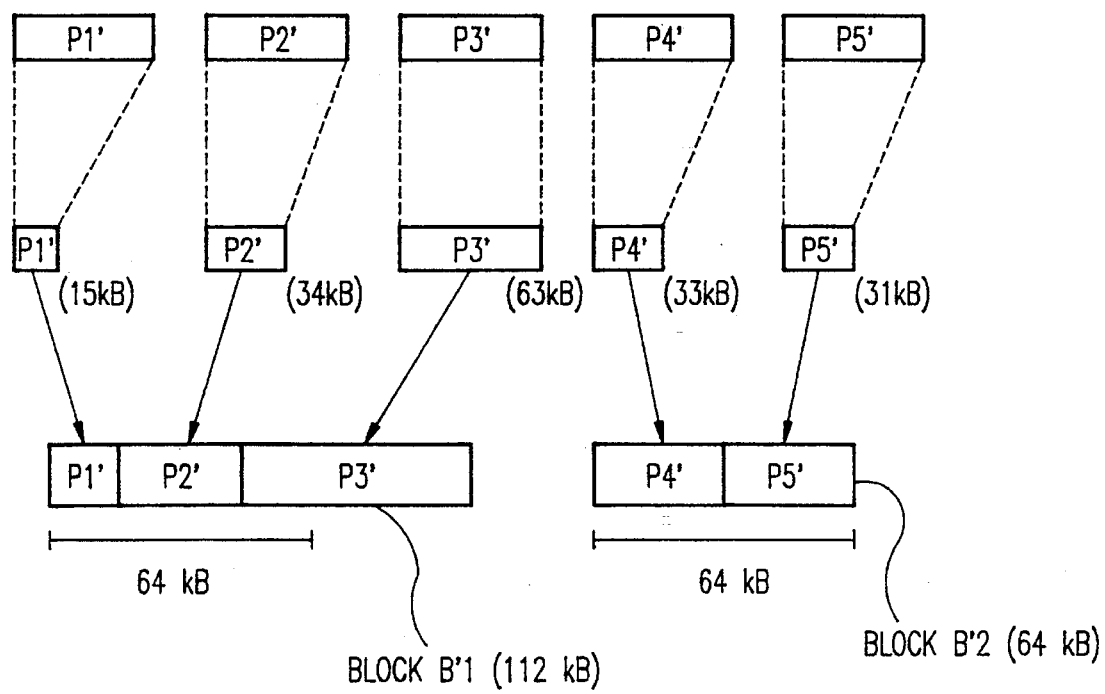
FIG. 2 shows steps for formation of a data block having size substantially larger than a reference size by means of the auto-blocking.

Referring to FIG. 2, when there is a packet or packets whose compression rate is low, there is a possibility of formation of a data block having size substantially larger than the reference length. In FIG. 2, compression rate of a packet P3' is low. Size of the packet P3' which is 63 kB is substantially larger than those of other packets. If the block B1 is to be formed from only packets P1' and P2', its size is shorter than the reference value of 64 kB by 15 kB. Therefore, the packet P3' is further added thereto, resulting in a block B1' having size of 112 kB which is substantially larger than the reference length.

Figure 3:
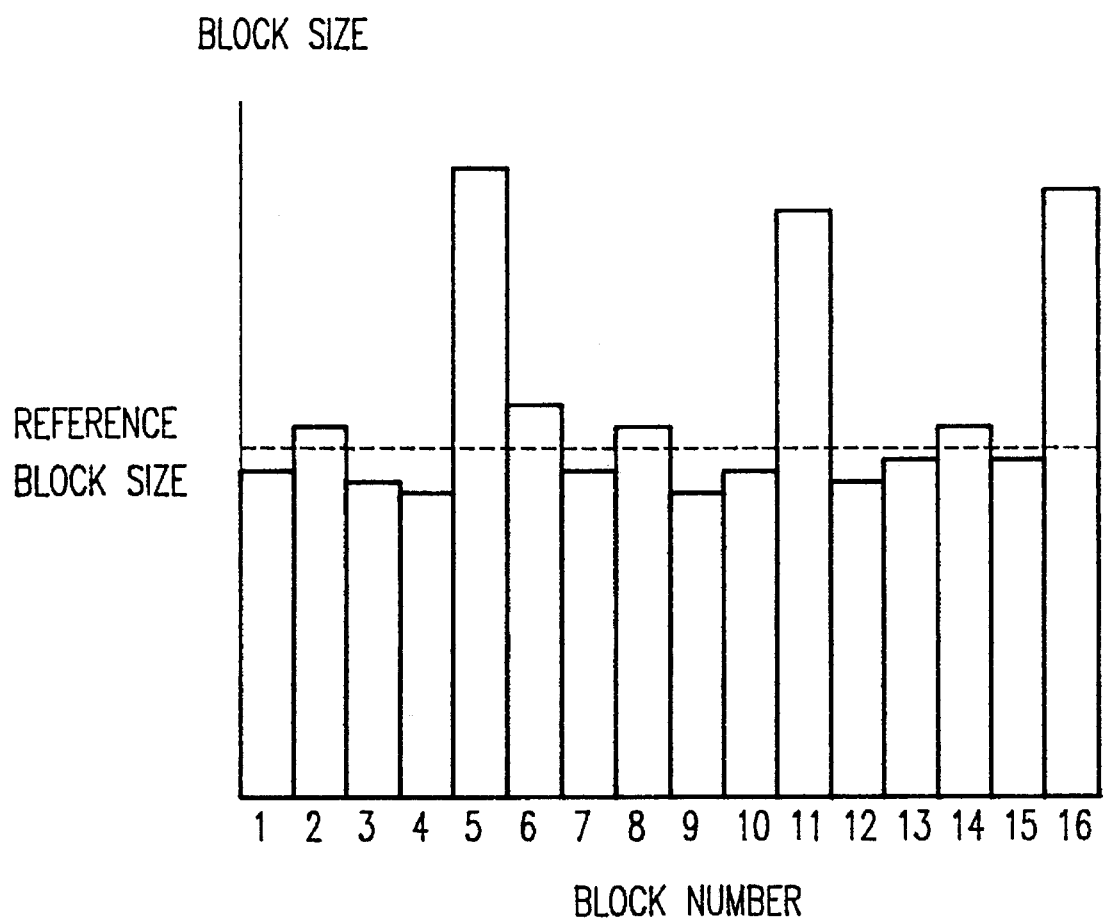
FIG. 3 shows a tendency of size of data block processed by the auto-blocking.

In this manner, a block having size substantially larger than the reference length can be formed by the auto-blocking although probability of successive occurrence of such large data blocks is very low. Referring to FIG. 3, such block having size much larger than that of the reference block may appear occasionally. In FIG. 3, a 5th, 11th and 16th blocks have large size. However, possibility of occurrence is lower than that shown in FIG. 3, practically.

A construction of a portion which is common for the pre-read control devices according to a first to third embodiments of the present invention will be described with reference to FIG. 4.

Figure 4:
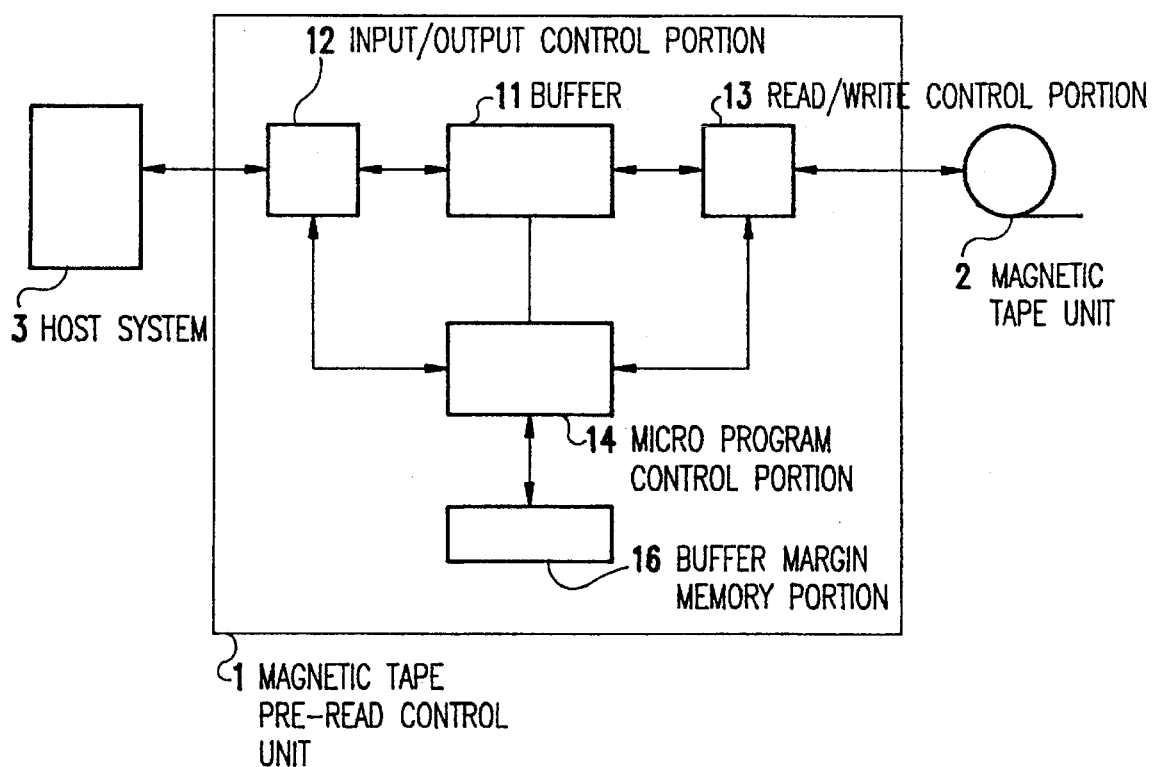
FIG. 4 is a block diagram showing a construction of a magnetic tape pre-read control device 1.

In FIG. 4, the magnetic tape pre-read control unit 1 according to the present invention is provided between a magnetic tape apparatus 2 and an host system 3. The magnetic tape pre-read control unit 1 operates asynchronously with the host system 3. The magnetic tape pre-read control unit 1 includes a buffer 11, an input/output control portion 12, a read/write control portion 13, a micro-program control portion 14 and a buffer margin memory portion 16.

The read/write control portion 13 stores data read out from a magnetic tape by the magnetic tape apparatus 2 in the buffer 11. The read/write control portion 13 further performs an error correction and D/A conversion, etc.

The buffer 11 stores data received from the read/write control portion 13.

The input/output control portion 12 sends the content of the buffer 11 to the host system 3 and receives instructions and data from the host system 3.

The micro-program control portion 14 controls operations of the input/output control portion 12 and the read/write control portion 13. Further, the microprogram control portion 14 sets addresses of the buffer 11 and, calculates an available capacity of the buffer 11 and size of data block which is read out.

The buffer margin memory portion 16 stores a numerical value. The value corresponds to the buffer maring. The value in the buffer margin memory portion 16 is a base of judgement as to whether a pre-read is to be continued.

Now, an operation of the magnetic tape pre-read control device 1 mentioned above will be described.

Upon a read instruction from the host system 3, it is judged whether or not an requested data block exists in the buffer 11.

When the requested data block is in the buffer 11, the block is sent from the buffer 11 to the host system 3.

Figure 5:
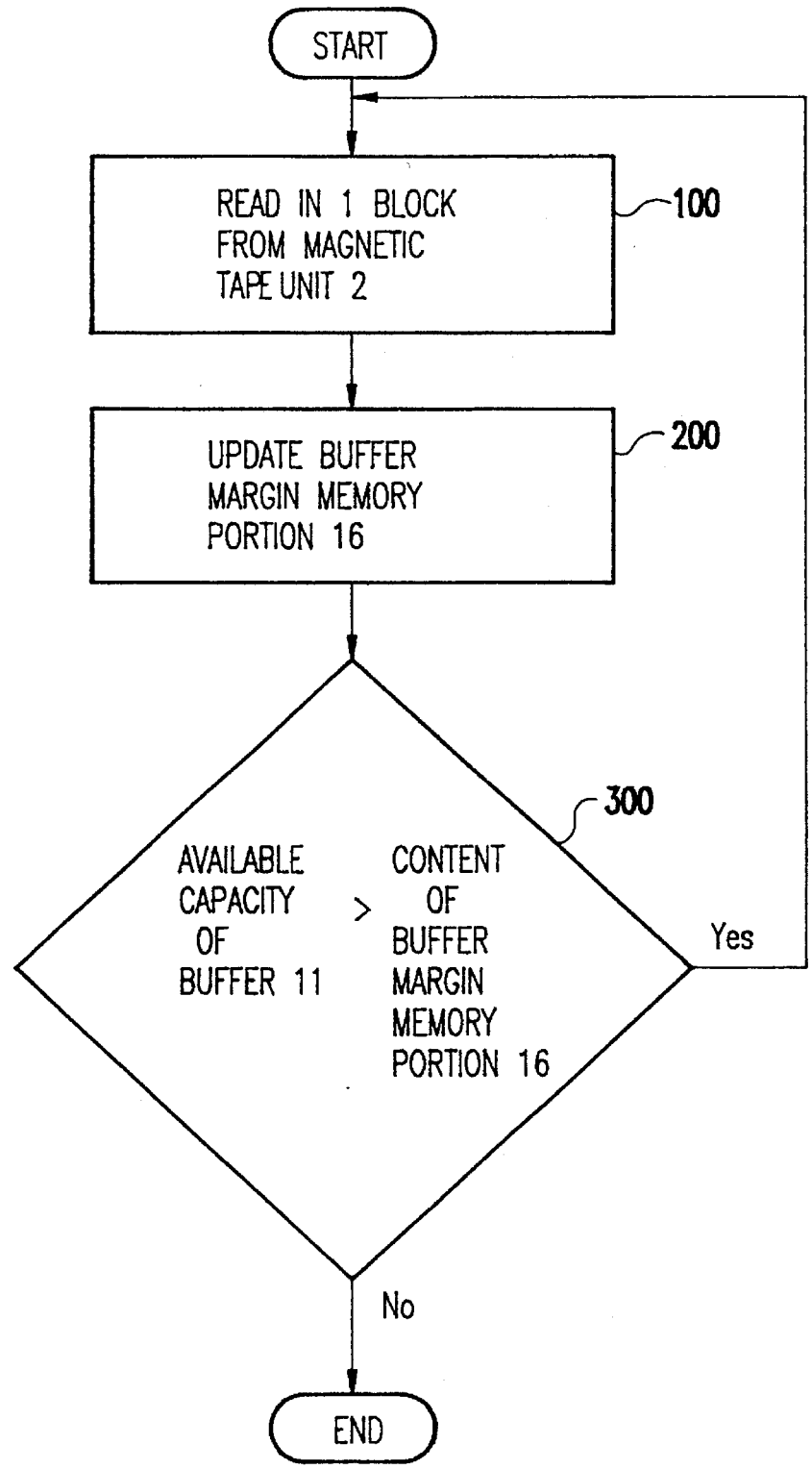
FIG. 5 is a flowchart showing an operation of a magnetic tape pre-read control device 1.

Referring to FIG. 5, when the requested block is not in the buffer 11, the step 100 is executed. In the step 100, a data block is read out from the magnetic tape apparatus 2. The data block thus read out is stored in the buffer 11. The data block stored in the buffer 11 is transferred to the host system 3 through the input/output control portion 12. The host system 3 completes the processing of the read instruction upon receipt of the data block. On the other hand, the magnetic tape pre-read control unit 1 executes the steps 200 to 300 continuously. A pre-read of the data block is performed through these steps.

In the step 200, a content of the buffer margin memory portion 16 is updated to a value which is determined on the basis of the size of data block read out in the past.

In the step 300, the available capacity of the buffer 11 is compared with the content of the buffer margin memory portion 16. When the available capacity of the buffer 11 is larger than the content of the buffer margin memory portion 16, the step 100 is executed again. This means that the pre-read is to be continued.

When the available capacity of the buffer 11 is smaller than the content of the buffer margin memory portion 16, the magnetic tape pre-read control unit 1 interrupts the processing. This means a completion of pre-read.

The steps 100 to 300 are realized as a microprogram to be executed in the micro-program control portion 14.

Respective embodiments of the present invention differ from each other in the processing in the step 200, that is, the updating method of the buffer margin memory portion 16.

Now, a first embodiment of the present invention will be described with reference to FIG. 6.

Figure 6:
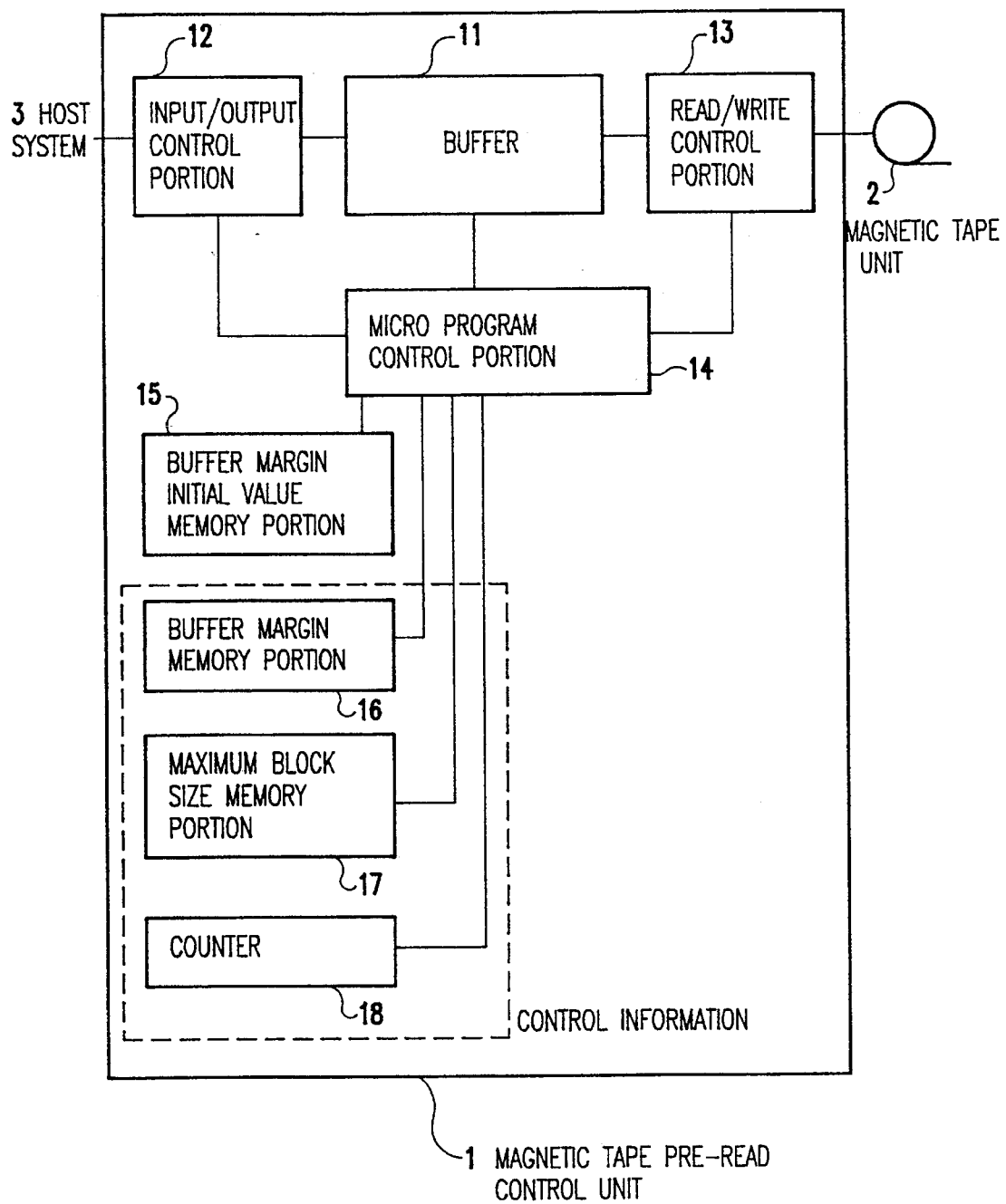
FIG. 6 is a block diagram showing a construction of a magnetic tape pre-read control device 1 according to a first embodiment of the present invention.

In FIG. 6, the magnetic tape pre-read control unit 1 according to the first embodiment of the present invention includes, in addition to the structural components shown in FIG. 4, a buffer margin initial value memory portion 15, a maximum block size memory portion 17 and a counter 18.

The buffer margin initial value memory portion 15 stores a fixed value. The content of the buffer margin initial value memory portion 15 is an initial value of the buffer margin memory portion 16.

The maximum block size memory portion 17 stores a value which is the maximum size of sizes of blocks read out in the past. The content of the maximum block size memory portion 17 is updated by the micro program control portion 14.

The counter 18 is adapted to indicate a timing of change of the buffer margin. The buffer margin is changed when a count of the counter 18 reaches a predetermined value, unlike the conventional technique in which the buffer margin is changed every read of data block. Count-up/countdown of the counter 18 is controlled by the micro program control portion 14.

A region of a memory device to which the micro program control portion 14 is accessible is assigned for the buffer margin initial value memory portion 15, the buffer margin memory portion 16, the maximum block size memory portion 17 and the counter 18.

Figure 7:
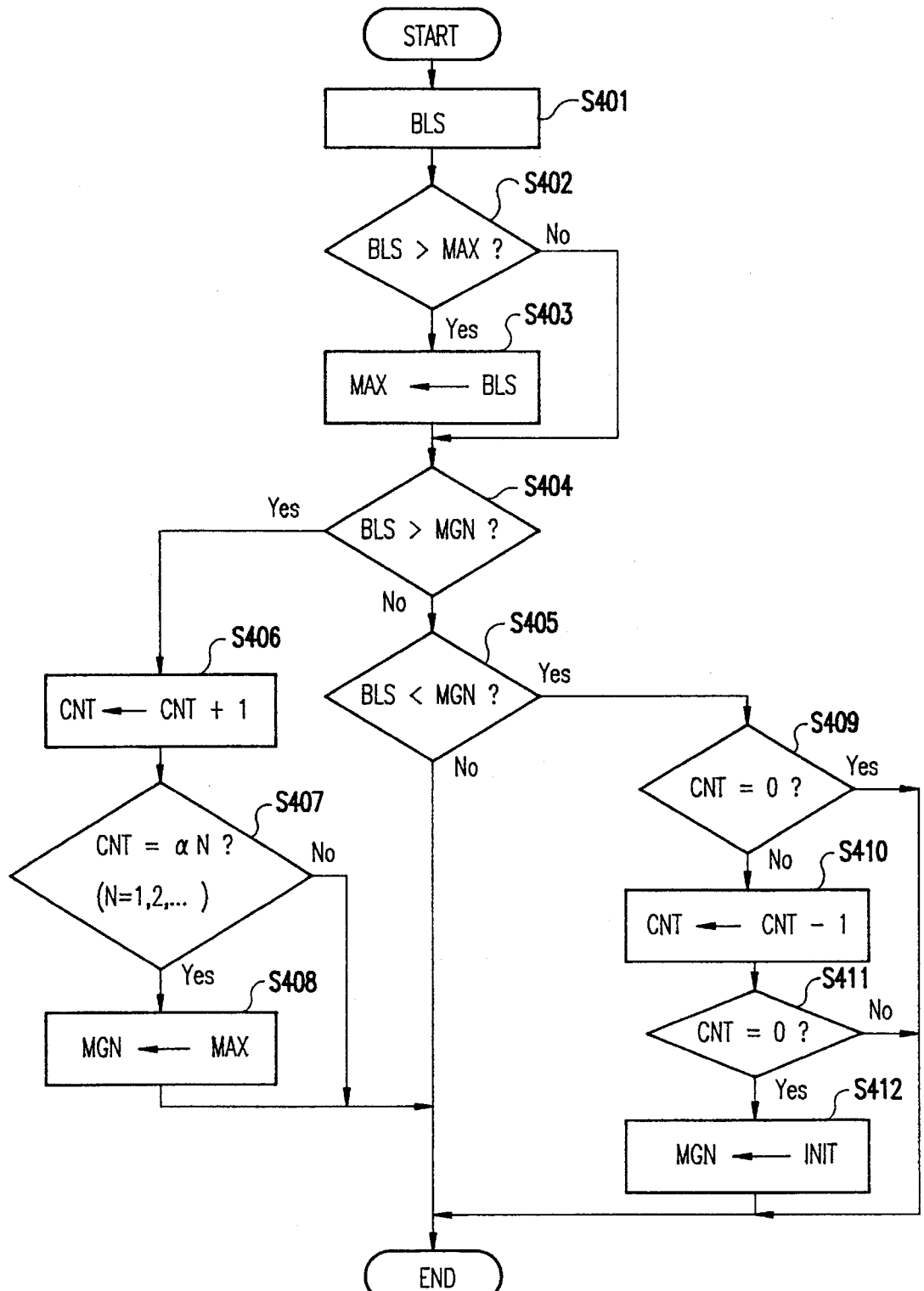
FIG. 7 is a flowchart-showing an operation of a microprogram control portion 14 according to the first embodiment of the present invention.

An operation of this embodiment will be described with reference to FIG. 5 in which the step 200 is a feature of this embodiment. The step 200 is shown in detail in FIG. 7. In FIG. 7, BLS, INIT, MGN, MAX, CNT and α indicate the size of a block read out, the content of the buffer margin initial value memory portion 15, the content of the buffer margin memory portion 16, the content of the maximum block size memory portion 17, the content of the counter 18 and a constant, respectively. The respective steps shown in FIG. 7 are executed by the micro program control portion 14. Although not shown in FIGS. 5 and 7, the content of the buffer margin initial value memory portion 15 is set in the buffer margin memory portion 16 at a start time of operation of the magnetic tape pre-read control unit 1.

Referring to FIG. 7, in the step 401, the size of the block read out in the step 100 is obtained from a difference between a head address and an end address of the buffer 11.

The steps 402 and 403 are to store the maximum value of sizes of blocks read out in the past in the maximum block size memory portion 17.

In the step 402, the size of the block is compared with content of the maximum block size memory portion 17. When the block size is larger than the content of the maximum block size memory portion 17, the block size is stored in the maximum block size memory portion 17 in the step 403.

In the step 404, the block size is compared with the content of the buffer margin memory portion 16 and, when the block size is larger than the content of the buffer 10 margin memory portion 16, the step 406 is executed. Otherwise, the step 405 is executed.

In the step 405, the block size is compared with the content of the buffer margin memory portion 16 and, when the block size is smaller than the content of the buffer margin memory portion 16, the step 409 is executed. Otherwise, the step 200 is completed.

The steps 406 to 408 are to increase the buffer margin. Such change of the buffer margin is performed every time when the count of the counter 18 reaches a predetermined value.

In the step 406, a value of 1 is added to the count of the counter 18.

In the step 407, it is determined whether or not the count of the counter 18 reaches a value which is a multiple of α. When the count of the counter 18 is a multiple of α, the step 408 is executed. Assuming that α is 4, the step 408 is executed at a time when the count of the counter 18 becomes 4, 8, 12, . . . . Otherwise, the step 200 is completed.

In the step 408, the content of the maximum block size memory portion 17 is stored in the buffer margin memory portion 16.

The steps 409 to 412 are to reduce the buffer margin. The buffer margin is changed by setting the content of the buffer margin initial value memory portion 15 in the buffer margin memory portion 16 every time when the count of the counter 18 becomes 0.

In the step 409, it is determined whether or not the count of the counter 18 is 0. When the count of the counter 18 is 0, the step 200 is completed. There is no case in the step 409 the count of the counter 18 becomes smaller than 0.

In the step 410, the count of the counter 18 is reduced by 1.

In the step 411, it is determined whether the count of the counter 18 is 0. When the count is 0, the step 412 is executed. Otherwise, the step 200 is completed.

In the step 412, the content of the buffer margin initial value memory portion 15 is set in the buffer margin memory portion 16.

The meaning of the steps 401 to 409 will be described. According to the steps 401 to 409, the buffer margin is not changed immediately after an appearance of a block whose size is larger than the buffer margin. The counter is incremented every occurrence of the block having size not smaller than the buffer margin.

The buffer margin is changed every time the count of the counter reaches a predetermined value. The counter is decremented every appearance of a block whose size is less than the buffer margin. Therefore, the buffer margin is changed only when blocks each having size larger than the buffer margin appear successively. The buffer margin is not changed in a situation where such large block appears sporadically.

In updating the buffer margin, the the block size to be set in the buffer margin memory portion 16 as a new buffer margin is not size of the block currently read out but the maximum value of size of block among blocks appeared in the past, in order to prevent the buffer margin from being set with too small value when size of the block read out during the updating is relatively small.

The buffer margin is returned to the initial value every time the count of the counter becomes 0. Therefore, it is possible to return the buffer margin to an appropriate value when the size of block which is temperature increased is returned to usual value.

The difference in operation between this embodiment and the previously mentioned prior art will be described with reference to an example of operation.

Figure 8A:
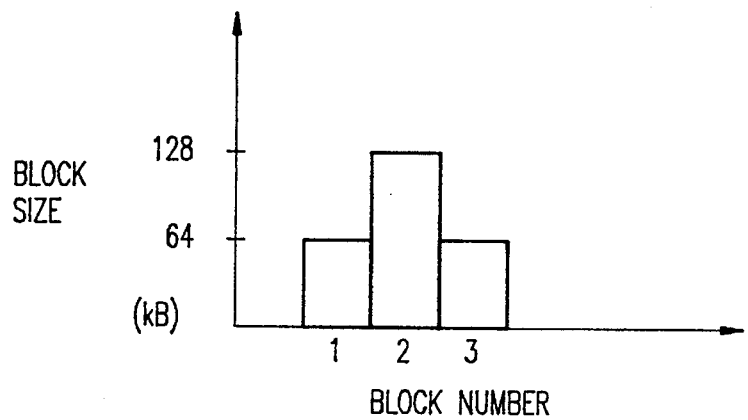
FIGS. 8(a), 8(b) and 8(c) show an operation of the first embodiment.

In FIG. 8(a), the sizes of the 1st, 2nd and 3rd data blocks are 64 kB, 128 kB and 64 kB, respectively.

Figure 8B:
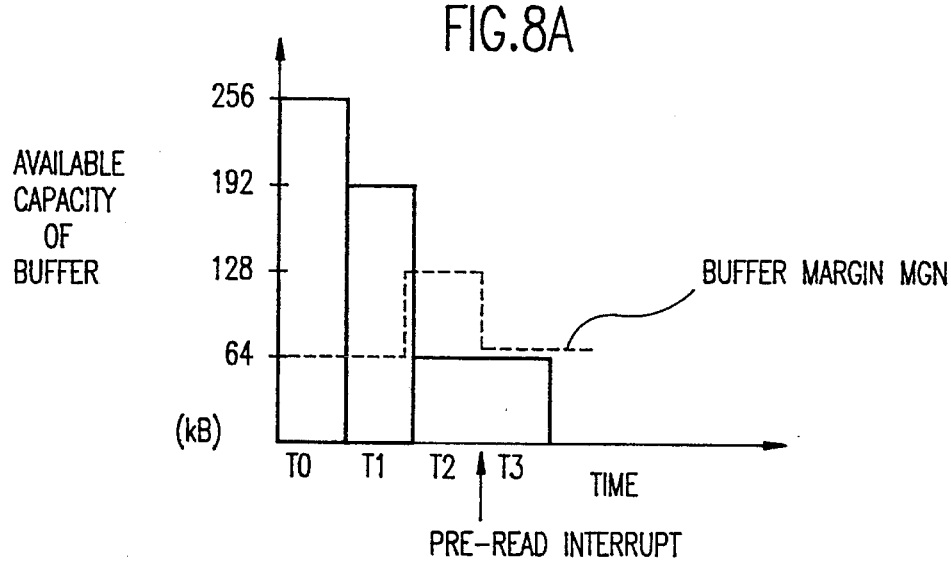

Describing, first, the operation of the prior art with reference to FIG. 8(b), the available capacity of the buffer 11 at time instance T0 is 256 kB.

At time instance T1, the 1st data block is read in the buffer 11 and thus the available capacity of the buffer 11 is reduced to 192 kB. The size of the 1st block, 64 kB, is set as the buffer margin.

At time instance T2, the 2nd block is read in the buffer 11 and thus the available capacity of the buffer 11 becomes 64 kB. The size of the 2nd block, 128 kB, is set as the buffer margin. Since the new buffer margin, 128 kB is larger than the available capacity of the buffer, 64 kB, the pre-read is terminated.

After time instance T2, the pre-read is terminated in the prior art despite the fact that the buffer 11 has the available capacity large enough to read in the 3rd block.

Now, the operation of the present invention will be described with assumption α=2 and with initial value of the buffer margin being 64 kB.

Figure 8C:
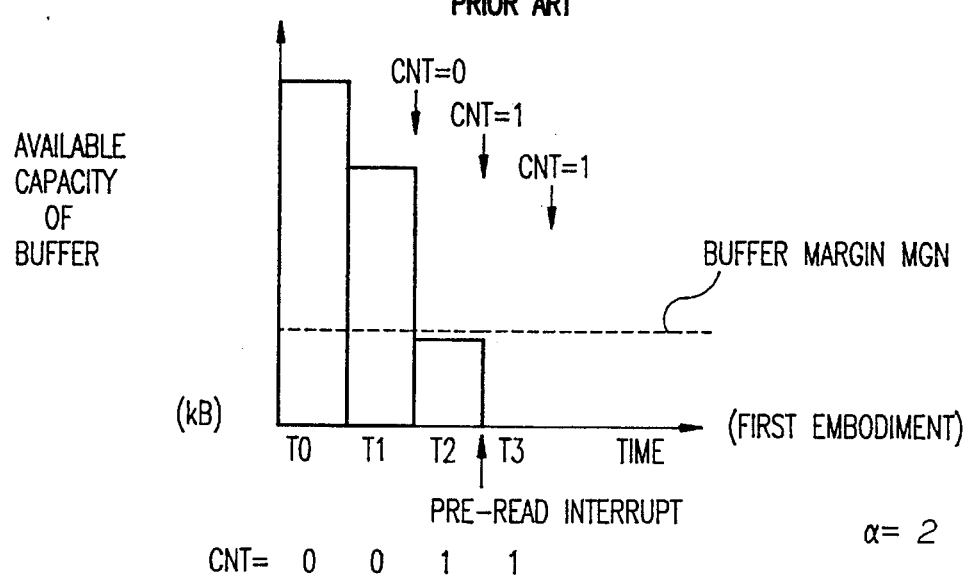

In FIG. 8(c), at time instance T0, the available capacity of the buffer 11 is 256 kB.

At time instance T1, the 1st data block is read in the buffer 11 and thus the available capacity of the buffer 11 is reduced to 192 kB. Since the size of the 1st block is equal to the buffer margin, the steps 406 to 412 are not executed.

At time instance T2, the 2nd block is read in the buffer 11 and thus the available capacity of the buffer 11 becomes 64 kB. The size of the 2nd block is larger than the buffer margin, the counter 18 is incremented. Since however, the count of the counter 18 does not reach α=2, the buffer margin is not updated. Further, the buffer margin is equal to the available capacity of the buffer 11, the pre-read is continued.

At time instance T3, the 3rd block is read in the buffer 11 and thus the available capacity of the buffer 11 is reduced to 0 kB. Since the available capacity of the buffer 11 is smaller than the buffer margin, the pre-read is terminated.

As described above, in the pre-read control system of this embodiment, the buffer margin is not changed by sporadic appearance of data block whose size is larger than the reference value and, therefore, the buffer 11 can be effectively utilized.

Now, the method of setting α will be described.

When α is too large, there may be a case where the size of data block read out exceeds the available capacity of the buffer due to delay of change of the buffer margin. On the other hand, when α is too small, the desired effect of this embodiment can not be obtained. Therefore, it is preferable to determine α on the basis of the size of block whose appearance is predicted. This will be described in detail with reference to an example shown in FIGS. 9(a) to 9(c).

Figure 9A:
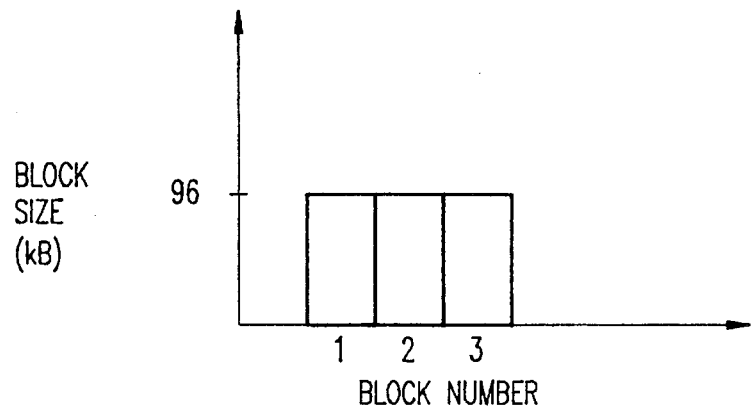
FIGS. 9(a), 9(b) and 9(c) show a method of determining a variable in the first embodiment.

In FIG. 9(a), sizes of the 1st to 3rd blocks are commonly 96 kB.

Figure 9B:
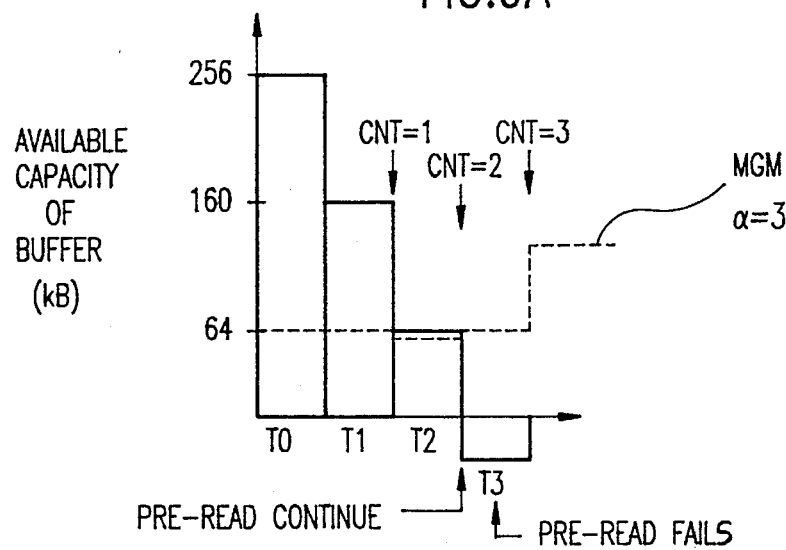

Referring to FIG. 9(b), the buffer margin is updated after time instance T3 when α=3. At time instance T3, the buffer margin is equal to the available capacity of the buffer 11. Therefore, the pre-read continues and the 3rd block is read in. Since, however, the size of the 3rd block is larger than the available capacity of the buffer 11 at time instance T3, the pre-read fails.

Figure 9C:
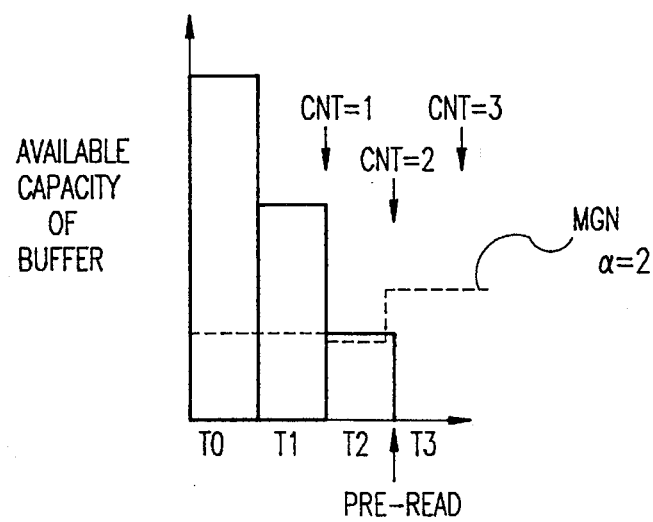

In FIG. 9(c), with α=2, the buffer margin is updated to 96 kB after time instance T2. Therefore, the pre-read terminates before time instance T3 and the pre-read does not fail.

As mentioned above, it is possible to set α appropriately on the basis of the predicted value, 96 kB, of the block size.

A second embodiment of the present invention will be described with reference to FIG. 10.

Figure 10:
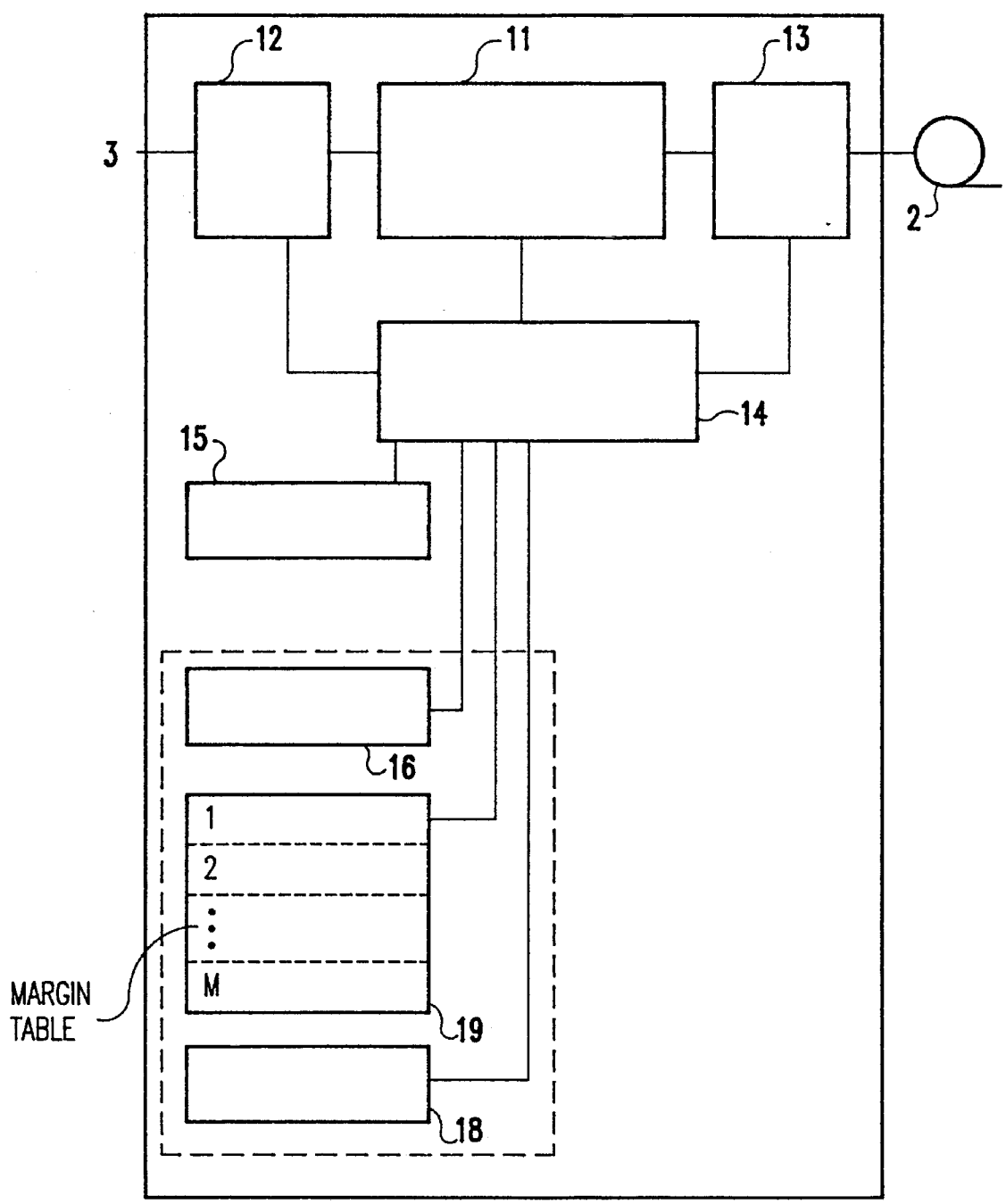
FIG. 10 is a block diagram showing a construction of a magnetic tape pre-read control device 1 according to a second embodiment of the present invention.

In FIG. 10, a magnetic tape pre-read control unit 1 of the second embodiment has the same construction as that shown in FIG. 6 except a margin table 19 is used instead of the maximum block size memory portion 17.

The margin table 19 can store M values, that is, the minimum value TBL(1) to the maximum value TBL (M) which are sorted in the order and are candidate values for the buffer margin. In this embodiment, a difference between adjacent TBL values is β. For example, when β=64 kB, TBL(1)=128 kB, TBL(2)=192 kB, TBL(3)=256 kB, and so on.

Now, an operation of this embodiment will be described with reference to FIGS. 11 to 13.

Figure 11:
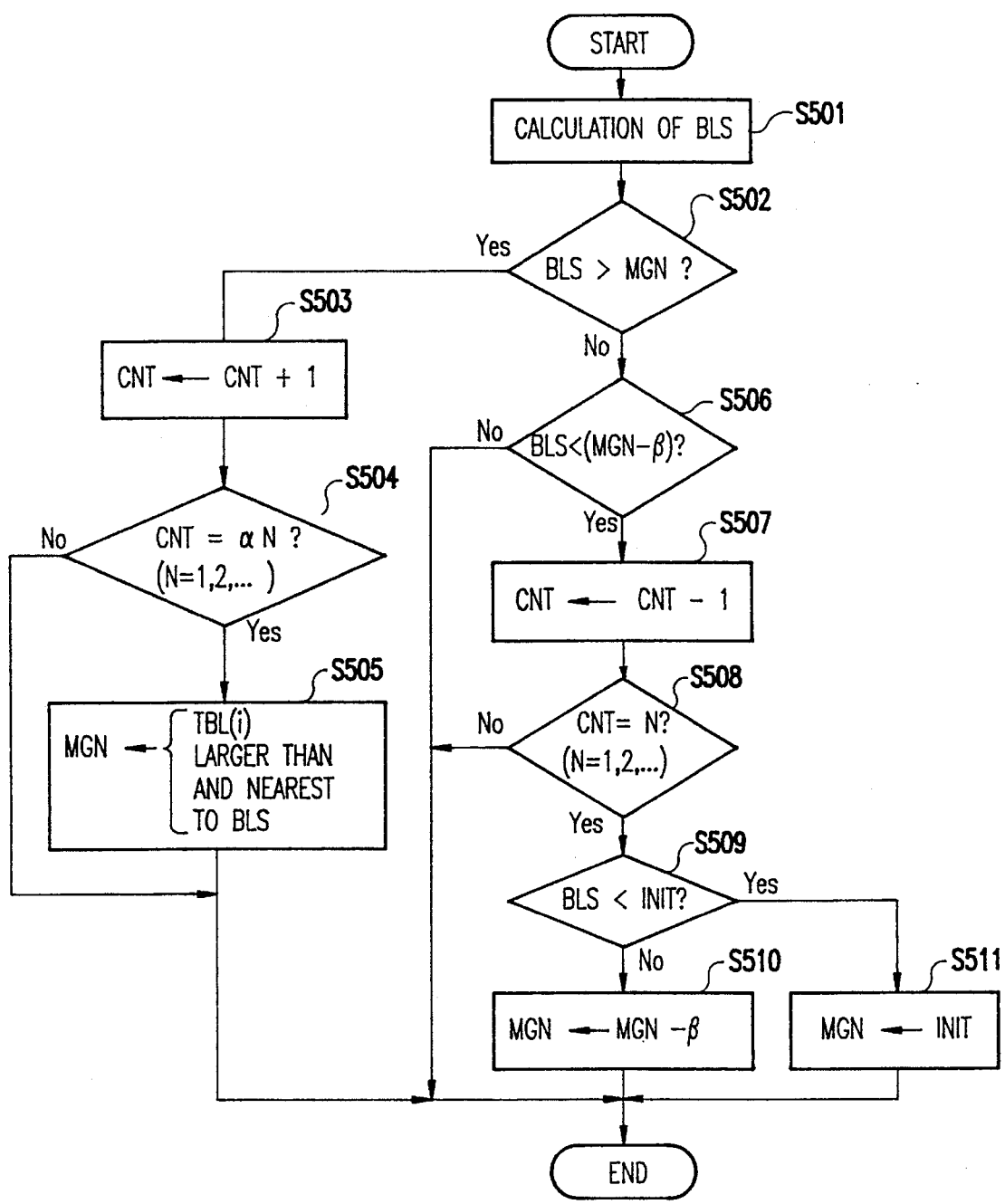
FIG. 11 is a flowchart showing an operation of a microprogram control portion 14 according to the second embodiment of the present invention.

In FIG. 11, the step 200 is constituted with the steps 501 to 511.

The step 501 is the same as the step 401 of the first embodiment.

In the step 502, the size of a block read out in the step 100 is compared with the content of the buffer margin memory portion 16. When the block size is larger than the content of the buffer margin memory portion 16, the step 503 is executed. Otherwise, the step 506 is executed.

In the step 506, the block size subtracted by β is compared with the content of the buffer margin memory portion 16. When the current value of the buffer margin memory portion 16 is equal to TBL(i), the current value of the buffer margin memory portion 16 subtracted by β is equal to TBL(i−1). That is, in the step 506, the block size is compared with TBL(i−1). If the block size is larger than TBL (i−1), the step 507 is executed. Otherwise, the step 200 is completed.

The steps 503 to 505 are to increase the buffer margin.

In the step 503, the count of the counter 18 is increased by 1.

In the step 504, it is determined whether or not the count of the counter 18 reaches a value which is a multiple of α. When the counter 18 reaches a multiple of α, the step 505 is executed and, otherwise, the step 200 is completed.

In the step 505, a value among values stored in the margin table 19 which is nearest to the block size is stored in the buffer margin memory portion 16.

Figure 12:
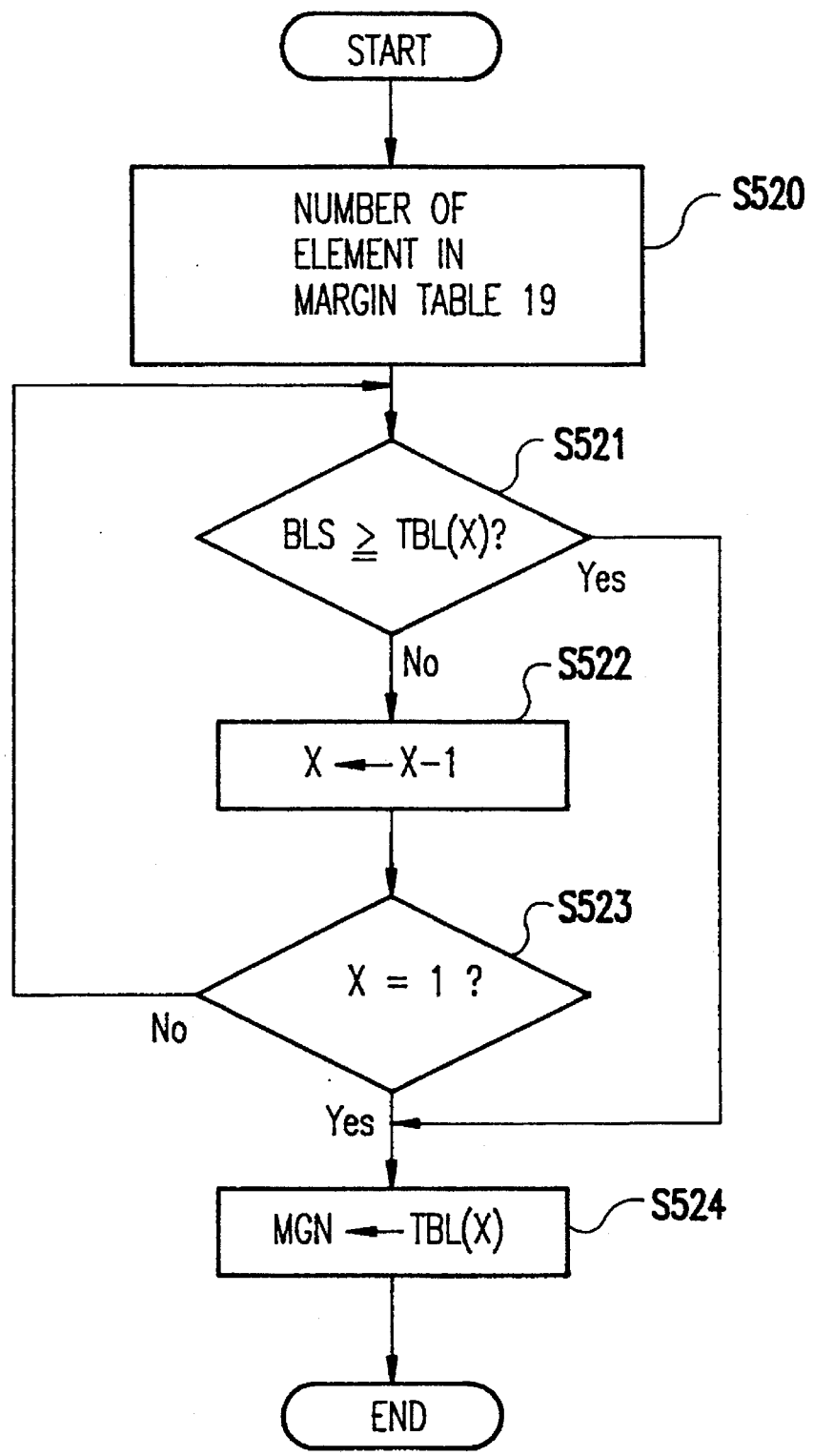
FIG. 12 shows a flowchart showing the step 505 in FIG. 11 in detail.

Referring to FIG. 12, the step 505 is realized by the steps 520 to 524.

In the step 520, the element number M of the margin table 19 is set to a variable X.

In the step 521, the block size is compared with TBL(X). When the block size is larger than TBL(X), the step 524 is executed and, otherwise, the step 522 is executed.

In the step 522, the variable X is reduced by 1.

In the step 523, it is determined whether or not X is 1. When X=1, the step 524 is executed and, otherwise, the step 521 is executed.

In the step 524, TBL(X) is stored in the buffer margin memory portion 16.

Referring to FIG. 11 again, the steps 507 to 511 are to reduce the buffer margin.

In the step 507, the count of the counter 18 is reduced by 1.

In the step 508, it is determined whether or not the count of the counter 18 reaches a value which is a multiple of α. When the counter 18 reaches a multiple of α, the step 509 is executed and, otherwise, the step 200 is completed.

In the step 509, the block size is compared with the content of the buffer margin initial value memory portion 15. When the block size is smaller than the content of the buffer margin initial value memory portion 15, the step 511 is executed and, otherwise, the step 510 is executed.

In the step 510, the content of the buffer margin memory portion 16 is reduced by β. This is equivalent to a case where the content of the buffer margin memory portion 16 is changed from TBL(i) to TBL(i−1). The step 200 completes simultaneously with completion of the step 510.

In the step 511, the content of the buffer margin initial value memory portion 15 is set in the buffer margin memory portion 16. The step 200 completes simultaneously with completion of the step 511.

A difference in operation between the first and second embodiments will be described with reference to FIG. 13(a) which shows an example of operation of the first embodiment when α=1 and FIG. 13(b) which shows an operation of the second embodiment with α=1 and β=64 kB. In these figures, solid line indicates the size of block read out and dotted line indicates the content of the buffer margin memory portion 16. Ideally, the solid line coincides with the dotted line. The initial value of the buffer margin is 64 kB.

Figure 13A:
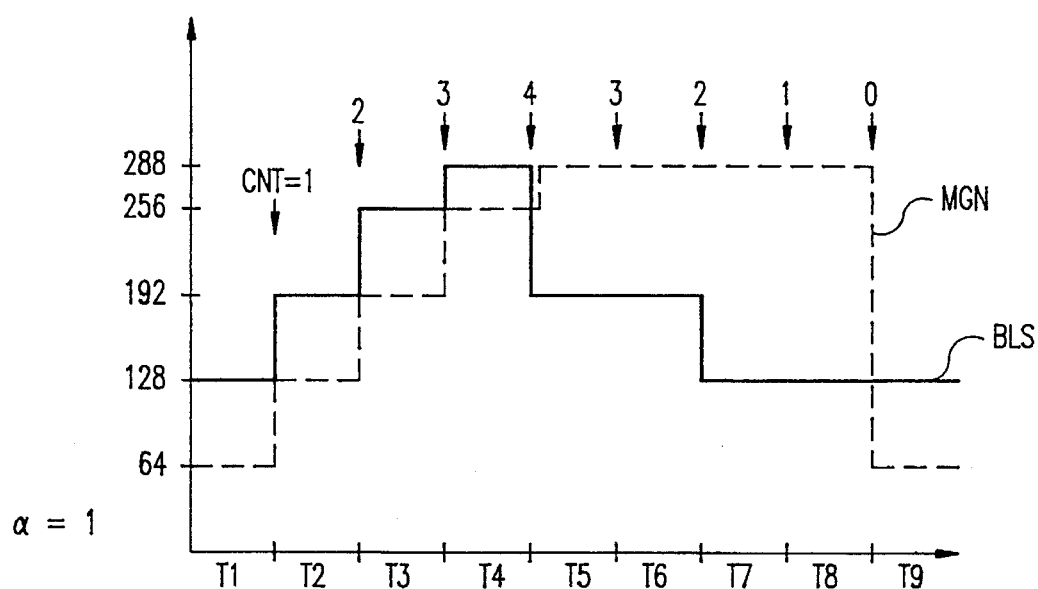
FIGS. 13(a) and 13(b) show an operation of the second embodiment.

In FIG. 13(a), in a time period T1 to T4, the block size is the larger the content of the buffer margin memory portion 16. The block size reduces after time instance T5 and so does the count of the counter 18. After time instance T8, the counter becomes 0. Therefore, the buffer margin is set to the initial value =64 kB. However, a practical size of the block is 128 kB.

As mentioned, in the first embodiment, the buffer margin is returned to the initial value when the block size is reduced. In this case, if the block size differs from the initial value of the buffer margin, the pre-read may fail or the utilization efficiency of the buffer may be degraded.

Figure 13B:
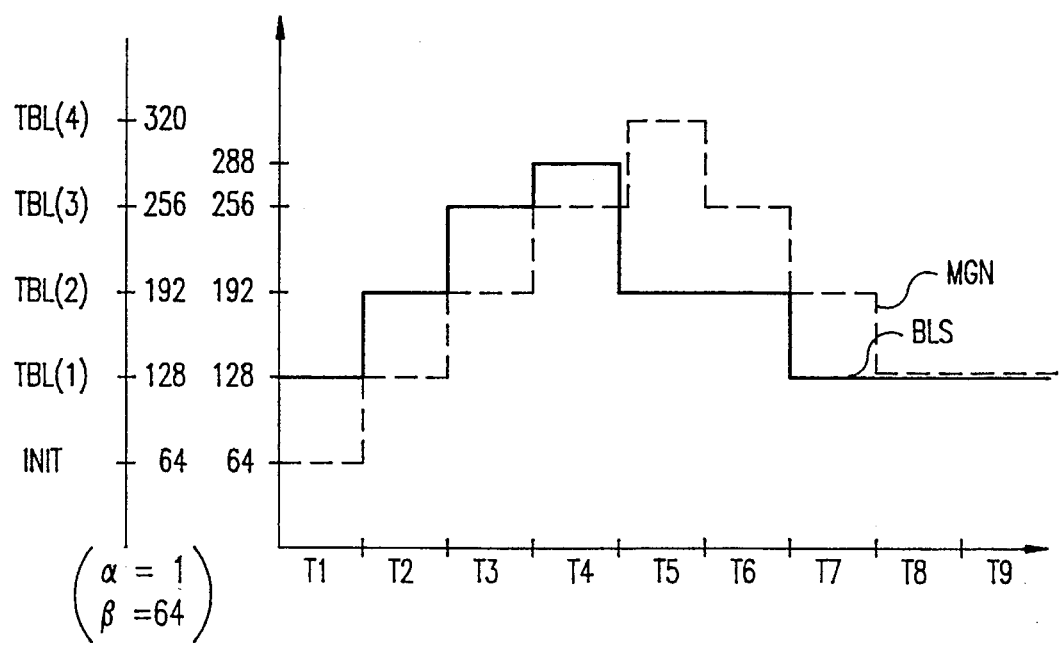

In FIG. 13(b), in the second embodiment, the content of the buffer margin memory portion 16 is decremented in a time period from T6 to T8 and becomes TBL(1)=192 kB at time instance T8. This is equal to the practical size of the block.

As is clear from FIG. 13(b), in the second embodiment, a value among a plurality of values set in the margin table 19 which is nearest to the size of the block read out is used as the buffer margin. The buffer margin is reduced steppingly. Therefore, it is possible to make the content of the buffer margin memory portion 16 close to the practical block size.

In a modification of the second embodiment, it is possible to store one of TBL(1) to TBL(M) which is nearest to the block size in the buffer margin memory portion 16 in the step 510.

Figure 14:
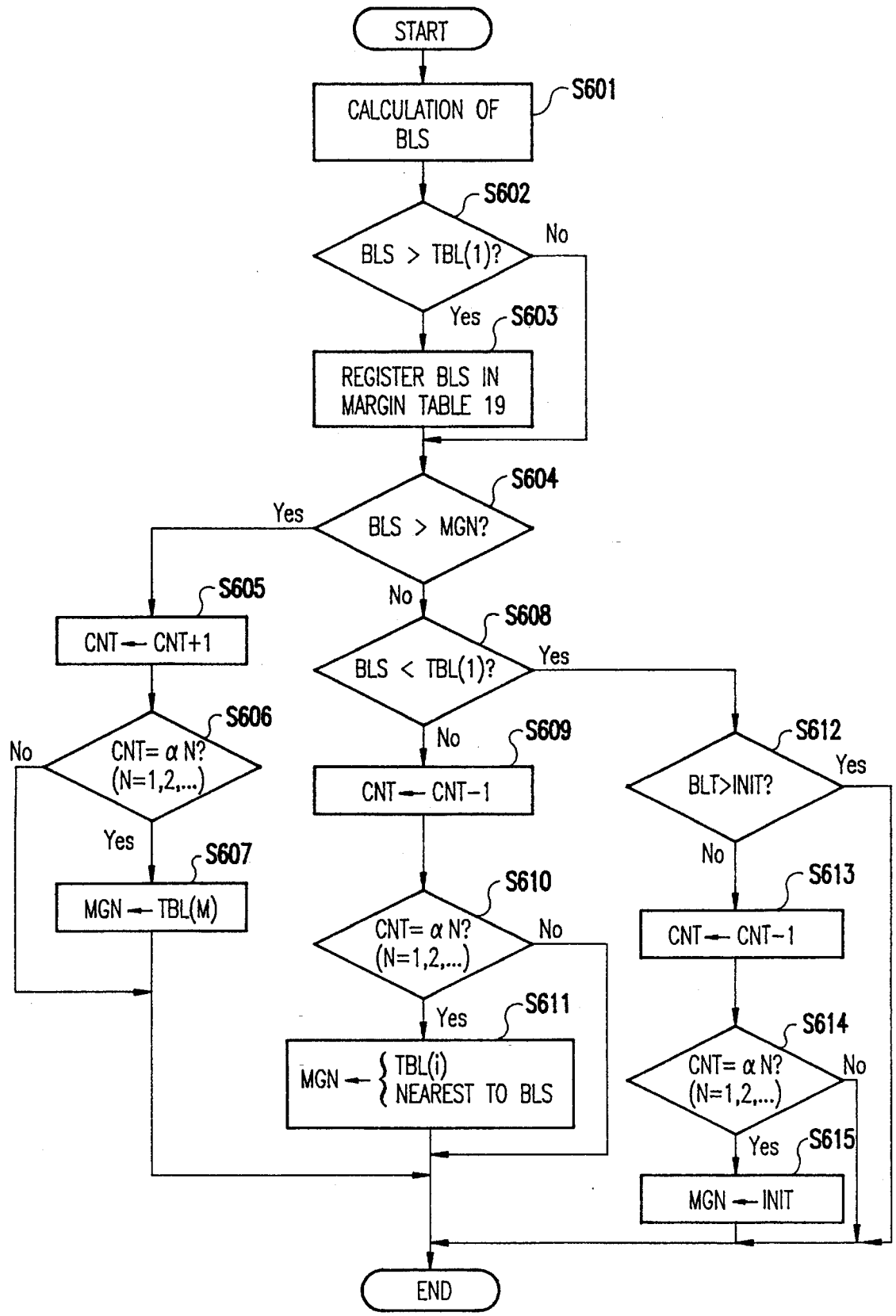
FIG. 14 is a flowchart showing an operation of a microprogram control portion 14 according to a third embodiment of the present invention.

A third embodiment of the present invention will be described with reference to FIG. 14. A magnetic tape pre-read control unit 1 of the third embodiment is the same as that of the second embodiment except that the content of the margin table 19 is set by the micro program control portion 14. TBL(1) to TBL(M) are sorted in the order.

Describing an operation of the third embodiment, the step 200 is constituted with the steps 601 to 615.

The step 601 is the same as the step 401 of the first embodiment.

In the step 602, the size of a block read out in the step 100 is compared with TBL(1) which is the smallest among TBL(1) to TBL(M). When the block size is larger than TBL(1), the step 603 is executed and, otherwise, the step 604 is executed.

In the step 603, the block size is stored in the margin table 19. As a result, the content of TBL(i) which is not larger than the block size is updated.

In the step 604, the block size is compared with the content of the buffer margin memory portion 16. When the block size is larger than the content of the buffer margin memory portion 16, the step 605 is executed and, otherwise, the step 608 is executed.

In the step 608, the block size is compared with TBL(1). When the block size is larger, the step 609 is executed and, otherwise, the step 612 is executed.

The steps 605 to 607 are to increase the buffer margin.

In the step 605, the count of the counter 18 is increased by 1.

In the step 606, it is determined whether or not the count of the counter 18 reaches a value which is a multiple of $\alpha$. When the counter 18 reaches a multiple of $\alpha$, the step 607 is executed and, otherwise, the step 200 is completed.

In the step 607, TBL(M) is set in the buffer margin memory portion 16.

The steps 609 to 611 are to reduce the buffer margin.

In the step 609, the count of the counter 18 is reduced by 1.

In the step 610, it is determined whether or not the count of the counter 18 reaches a value which is a multiple of $\alpha$. When the counter 18 reaches a multiple of $\alpha$, the step 611 is executed and, otherwise, the step 200 is completed.

In the step 611, a value among values TBL(1) to TBL(N) which is nearest to the block size is set in the buffer margin memory portion 16.

The steps 612 to 615 are to reset the buffer margin to the initial value.

In the step 612, the block size is compared with the initial value of the buffer margin. When the block size is larger than the initial value, the step 200 is completed and, otherwise, the step 613 is executed.

In the step 613, the count of the counter 18 is reduced by 1.

In the step 614, it is determined whether or not the count of the counter 18 reaches a value which is a multiple of $\alpha$. When the counter 18 reaches a multiple of $\alpha$, the step 615 is executed and, otherwise, the step 200 is completed.

In the step 615, the content of the buffer margin initial value memory portion 15 is set in the buffer margin memory portion 16.

A difference in operation between the first and third embodiments will be described with reference to FIG. 15(a) which is the same as FIG. 13(a) showing an operation of the first embodiment with $\alpha=1$, and FIG. 15(b) which shows an operation of the third embodiment with $\alpha=1$ and M=4. The block size is the same in the both figures and FIG. 15(c).

Referring to FIG. 15(c), sizes of blocks appeared in the past are stored in TBL(1) to TBL(M) during a period from T1 to T5. At time instance T5, the block size is reduced to 128 kB. In response to this reduction, the step 611 is executed. In the step 611, one of TBL(1) to TBL(M) which is nearest to the block size, that is, TBL(1)=128 kB, is set in the buffer margin memory portion 16.

As mentioned above, in the third embodiment, the block size is stored in the margin table 19 every time block having size larger than the buffer margin occurs. When the block size is reduced, a value among values stored in the margin table 19 which is nearest to the block size is set in the buffer margin. Therefore, when the block size is reduced, it is possible to set the buffer margin to a value near the block size.

Figure 16A:
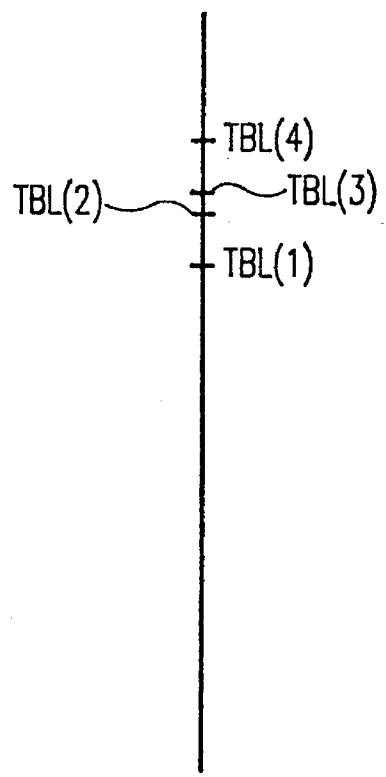
FIGS. 16(a) and 16(b) shows an operation of a modification of the third embodiment.
Figure 16B:
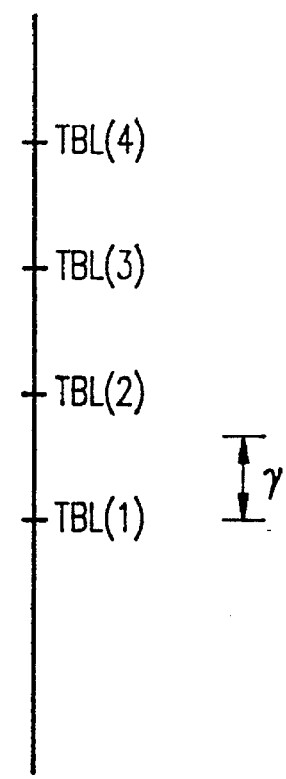

In a modification of the third embodiment, it is preferable to not store the block size in the margin table 19 in the step 603 when any of TBL(1) to TBL(M) exists in a range of the block size $\div\gamma$. By providing such condition, it is possible to maintain a difference between adjacent ones of TBL(1) to TBL(M). If there is no such condition provided, TBL(1) to TBL(M) may be too close to each other as shown in FIG. 16(a). In such situation, a selection range of buffer margin becomes narrow. On the contrary, if such condition is provided, a minimum gap $\gamma$ can be maintained between adjacent TBL(i), providing a wider selection range for buffer margin.

In first to third embodiment, it is preferable to set the content of the buffer margine initial value memory portion 15 into the buffer margin memory portion 16 when the magnetic tape is unloaded or replaced with another magnetic tape.

As this invention may be embodied in several forms without departing from the spirit of essential characteristics thereof, the present embodiment is therefore illustrative and not restrictive, since the scope of the present invention is defined by the appended claims rather than by the description preceding them, and all changes that fall within meets and bounds of the claims or equivalence of such meets and bounds are therefore intended to embraced by the claims.

What is claimed is:

1. A magnetic tape pre-read control method to be executed in a magnetic tape pre-read control unit including a buffer, first memory means and a counter, comprising the steps of:

(a) setting an initial value in said first memory means;

(b) reading a block from said magnetic tape and storing said block in said buffer;

(c) obtaining a size of said block;

(d) adding a predetermined value to a value of said counter when the size of said block is larger than a content of said first memory means;

(e) updating the content of said first memory means on the basis of a size of a block read out in the past, when the value of said counter reaches a predetermined value as a result of the addition in the step (d); and (f) interrupting a pre-read when an available capacity of said buffer is smaller than the content of said first memory means and, otherwise, continuing the pre-read.

2. A magnetic tape pre-read control method to be executed in a magnetic tape pre-read control unit including a buffer, first memory means, second memory means and a counter, comprising the steps of:

(a) setting an initial value in said first memory means;

(b) reading a block from a magnetic tape and storing said data block in said buffer;

(c) obtaining a size of said block;

(d) storing the size of said block in said second memory means when the size of said block is larger than a content of said second memory means;

(e) adding a predetermined value to a value of said counter when the size of said block is larger than a content of said first memory means;

(f) storing the content of said second memory means in said first memory means when, as a result of the addition in said step (e), the value of said counter becomes a predetermined value; and (g) interrupting a pre-read when an available capacity of said buffer is smaller than the content of said first memory means and, otherwise, continuing the pre-read.

3. The magnetic tape pre-read control method claimed in claim 2, further comprising the steps of:

(h) subtracting the content of said counter by a predetermined value when the size of said block is smaller than the content of said first memory means, the step (h) being performed after the step (d); and (i) setting the initial value in said first memory means when the value of said counter becomes a predetermined value as a result of the subtraction in the step (g).

4. The magnetic tape pre-read control method claimed in claim 2, further comprising the step of:

(j) initializing the contents of said first and second memory means when said magnetic tape is replaced by another magnetic tape.

5. A magnetic tape pre-read control unit comprising: a counter;

first memory means;

second memory means;

a buffer for storing a block read out from a magnetic tape;

means for obtaining a size of said block;

means for storing the size of said block in said second memory means when the size of said block is larger than a content of said second memory means;

means for adding a predetermined value to a value of said counter when the size of said block is larger than a content of said first memory means;

means for storing the content of said second memory means in said first memory means when the value of said counter becomes a predetermined value as a result of the addition by said adding means; and means for instructing an interruption of a pre-read when an available capacity of said buffer is smaller than the content of said first memory means and, otherwise, instructing a continuation of the pre-read.

6. The magnetic tape pre-read control device claimed in claim 5, further comprising:

means for reducing the content of said counter by a predetermined value when the size of said block is smaller than the content of said first memory means; and means for setting the initial value in said first memory means when the content of said counter becomes a predetermined value as a result of the reduction by said reducing means.

7. The magnetic tape pre-read control device claimed in claim 5, further comprising:

means for initializing the contents of said first and second memory means when said magnetic tape is replaced by another magnetic tape.

8. A magnetic tape pre-read control method to be executed in a magnetic tape pre-read control unit including a buffer, first memory means, second memory means holding a plurality of values preliminarily set therein and a counter, comprising the steps of:

(a) setting an initial value in said first memory means;

(b) reading a block from a magnetic tape and storing said block in said buffer;

(c) obtaining a size of said block;

(d) adding a predetermined value to a value of said counter when the size of said block is larger than a content of said first memory means;

(e) storing one of the values set in said second memory means which is nearest to the size of said block in said first memory means when the value of said counter becomes a predetermined value as a result of the addition in the step (d); and (f) interrupting a pre-read when an available capacity of said buffer is smaller than the content of said first memory means and, otherwise, continuing the pre-read.

9. The magnetic tape pre-read control method claimed in claim 8, further comprising the steps of:

(g) reducing a predetermined value from the content of said counter when the size of said block is smaller than the content of said first memory means, the step (g) being performed after the step (c); and (h) setting one of said values set in said second memory means which are smaller than a value currently set in said first memory means, in said first memory means when the value of said counter becomes a predetermined value as a result of the reduction in the step (g).

10. The magnetic tape pre-read control method claimed in claim 8, further comprising the steps of:

(i) initializing the contents of said first memory means when the magnetic tape is replaced by another magnetic tape.

11. A magnetic tape pre-read control unit comprising:

a counter;

first memory means;

second memory means for storing a plurality of values;

a buffer for storing a block read out from a magnetic tape;

means for obtaining a size of said block;

means for adding a predetermined value to a value of said counter when the size of said block is larger than a content of said first memory means;

means for storing one of said values stored in said second memory means which is nearest to the size of said block in said first memory means when the value of said counter becomes a predetermined value as a result of the addition by said adding means; and means for instructing an interruption of a pre-read when an available capacity of said buffer is smaller than the content of said first memory means and, otherwise, instructing a continuation of the pre-read.

12. The magnetic tape pre-read control unit claimed in claim 11, further comprising:

means for reducing the content of said counter by a predetermined value when the size of said block is smaller than a content of said first memory means; and means for setting a number x in said first memory means when the content of said counter becomes a predetermined value as a result of the reduction by said reducing means, said number x being one of the numbers set in said second memory means which are smaller than the value set in said first memory means.

13. The magnetic tape pre-read control unit claimed in claim 11, further comprising:

means for initializing the contents of said first memory means when said magnetic tape is replaced by another magnetic tape.

14. A magnetic tape pre-read control method to be executed in a magnetic tape pre-read control unit including a buffer, first memory means, second memory means holding a plurality of values and a counter, comprising the steps of:

(a) setting an initial value in said first memory means;

(b) reading a block from a magnetic tape and storing said block in said buffer;

(c) obtaining a size of said block;

(d) storing the size of said block in said second memory means when the size of said block is larger than a minimum value stored in said second memory means;

(e) adding a predetermined value to a value of said counter when the size of said block is larger than a content of said first memory means;

(f) storing a maximum value stored in said second memory means in said first memory means when the value of said counter becomes a predetermined value as a result of the addition in the step (e); and (g) interrupting a pre-read when an available capacity of said buffer is smaller than the content of said first memory means and, otherwise, continuing the pre-read.

15. The magnetic tape pre-read control method claimed in claim 14, further comprising the steps of:

(h) reducing a predetermined value from the content of said counter when the size of said block is between the content of said first memory means and the minimum value stored in said second memory means, the step (h) being performed after the step (d); and (i) setting one of said values stored in said second memory means which is nearest to the size of said block in said first memory means when the value of said counter becomes a predetermined value as a result of the reduction in the step (h).

16. The magnetic tape pre-read control method claimed in claim 14, further comprising the steps of:

(j) reducing a predetermined value from the content of said counter when the size of said block is smaller than the minimum value stored in said second memory means, the step (g) being performed after the step (d); and (k) setting the initial value in said first memory means when the value of said counter becomes a predetermined value as a result of the reduction in the step (j).

17. The magnetic tape pre-read control method claimed in claim 14, further comprising the steps of:

(l) initializing the contents of said first and second memory means when the magnetic tape is replaced by another magnetic tape.

18. A magnetic tape pre-read control unit comprising:

a counter;

first memory means;

second memory means for storing a plurality of values;

a buffer for storing a block read out from a magnetic tape;

means for obtaining a size of said block;

means for storing the size of said block in said second memory means when the size of said block is larger than the minimum value stored in said second memory means;

means for adding a predetermined value to a value of said counter when the size of said block is larger than a content of said first memory means;

means for storing the maximum value stored in said second memory means in said first memory means when the value of said counter becomes a predetermined value as a result of the addition by said adding means; and means for instructing an interruption of a pre-read when an available capacity of said buffer is smaller than the content of said first memory means and, otherwise, instructing a continuation of the pre-read.

19. The magnetic tape pre-read control unit claimed in claim 18, further comprising:

means for reducing the content of said counter by a predetermined value when the size of said block is between the content of said first memory means and the minimum value stored in said second memory means; and means for storing one of values set in said second memory means which is nearest to the size of said block in said first memory means when the value of said counter becomes a predetermined value as a result of the subtraction by said reducing means.

20. The magnetic tape pre-read control unit claimed in claim 18, further comprising:

means for reducing the content of said counter by a predetermined value when the size of said block is smaller than the minimum value stored in said second memory means; and means for storing the initial value in said first memory means when the value of said counter becomes a predetermined value as a result of the subtraction by said reducing means.

21. The magnetic tape pre-read control unit claimed in claim 18, further comprising:

means for initializing the contents of said first and second memory means when the magnetic tape is replaced by another magnetic tape.

* * * * *